United States Patent
Gibbons

(10) Patent No.: US 8,167,494 B2
(45) Date of Patent: May 1, 2012

(54) SQUEEZE-FILM DAMPER ARRANGEMENT

(75) Inventor: John L. Gibbons, Gloucester (GB)

(73) Assignee: Rolls-Royce PLC, London (GB)

( * ) Notice: Subject to any disclaimer, the term of this patent is extended or adjusted under 35 U.S.C. 154(b) by 617 days.

(21) Appl. No.: 12/379,529

(22) Filed: Feb. 24, 2009

(65) Prior Publication Data

US 2009/0263058 A1  Oct. 22, 2009

(30) Foreign Application Priority Data

Apr. 16, 2008  (GB) .................................. 0806817.3

(51) Int. Cl.
*F16C 27/00* (2006.01)

(52) U.S. Cl. ........................................ 384/99
(58) Field of Classification Search .................. 384/517, 384/581, 99, 288, 499, 500, 502, 518, 535, 384/563

See application file for complete search history.

(56) References Cited

U.S. PATENT DOCUMENTS

| 4,392,751 A | * | 7/1983 | Ida et al. ........................ 384/99 |
| 5,067,825 A | | 11/1991 | Vance et al. |
| 5,106,208 A | | 4/1992 | Bobo et al. |
| 5,149,206 A | | 9/1992 | Bobo |
| 5,178,400 A | * | 1/1993 | Singh ............................ 277/644 |
| 5,201,585 A | * | 4/1993 | Gans et al. ...................... 384/99 |
| 5,205,384 A | * | 4/1993 | Heshmat .................... 188/264 B |
| 5,344,239 A | | 9/1994 | Stallone et al. |

* cited by examiner

*Primary Examiner* — Thomas R Hannon
*Assistant Examiner* — Phillip A Johnson
(74) *Attorney, Agent, or Firm* — Oliff & Berridge, PLC

(57) ABSTRACT

A squeeze-film damper arrangement comprising: concentric inner and outer components defining an annular gap there between for accommodating radial motion of the inner component within the outer component; and a fluid filling the annular gap around the outside of the inner component for damping said radial motion of the inner component, the fluid being axially contained between spaced-apart, radially-compliant first and second face-seals provided between the inner and outer components; wherein the first face-seal is provided between the opposing faces of a first pair of radially overlapping circumferential sealing elements associated with the inner and outer components respectively, a first one of the circumferential sealing elements in said pair being mounted for axial movement relative to the associated inner or outer component and being axially biased against the second of said circumferential sealing elements in said pair to form the first face-seal.

20 Claims, 5 Drawing Sheets

SQUEEZE-FILM DAMPER ARRANGEMENT

The present invention relates to a squeeze-film arrangement.

The term 'squeeze-film' is typically used to refer to a type of hydraulic damper for damping vibratory or orbital motion of a rotating shaft rotating in a set of bearings.

Such squeeze-films generally comprise an annular gap around the outside of the bearing outer race, between the outside diameter of the bearing outer race and the external bearing housing, which gap is supplied through feeds with a suitable damping fluid such as oil; to prevent significant oil loss from the squeeze film, the axial ends of the squeeze film are sealed.

During operation, the oil is squeezed back and forth by "off-axis" (radial) movement of the bearing outer race within the bearing housing, particularly orbital movement of the outer race within the housing, and this squeezing action gives rise to reactionary damping forces exerted by the oil, which dampen the radial movement of the bearing outer race (and hence the associated rotating shaft).

Examples of these squeeze-films can be found in a wide variety of rotating machinery, particularly in high speed applications such as gas turbines where rolling element bearings are used and which tend to provide insufficient inherent damping to cope with the inevitable rotor vibration.

In addition, certain fluid bearings might also exhibit inherent squeeze-film properties. For example, the fluid bearings used to support a connecting rod in an internal combustion engine can be designed to provide squeeze-film dampening of impulses due to mechanical shock. In this sense, certain fluid bearings can themselves also be considered to be 'squeeze-films' for present purposes.

The limits of squeeze-film performance can be modelled using the Reynolds equation and appropriate boundary conditions.

In the so-called short bearing approximation, the fluid flow within the squeeze film is assumed to be entirely axial, with a parabolic axial pressure distribution between the ends of the squeeze film. The corresponding solution to the Reynolds equation yields a highly non-linear damping characteristic.

In the so-called long bearing approximation, the squeeze film is assumed to be of infinite length such that all parameters are constant along the length of the squeeze film and the fluid flow within the squeeze-film is solely circumferential. The corresponding solution to the Reynolds equation yields a more linear damping characteristic that also provides greater damping.

In practice, squeeze films are necessarily of finite axial length, but a reasonable approximation of an infinitely long squeeze film can be achieved by providing efficient seals at the axial ends of the squeeze film to limit axial fluid flow within the squeeze film as far as possible. Thus, where "long-bearing" damping performance is required, the seal performance at the axial ends of the squeeze film becomes a critical consideration, not only in preventing oil loss from the squeeze film but also in maintaining the desired damping characteristics.

A conventional "long-bearing" squeeze-film arrangement 1 is shown in FIG. 1, where face seals are used to seal the axial ends of the respective squeeze-film. Here, a shaft 2 is supported for rotation about a bearing axis A by a caged ball-bearing assembly 4 which is concentrically located within a bearing casing 6. A squeeze-film 8 is provided in the annular gap defined between the bearing casing 6 and the outer race 4a of the bearing assembly 4. Although in FIG. 1 the bearing assembly 4 is shown centred in the bearing casing, the bearing assembly 4 may alternatively 'sit' at the bottom of the bearing casing 6 under its own weight; nevertheless, the bearing casing 6 and bearing assembly 4 is still described as 'concentric' and the gap defined between the bearing casing 6 and the outer race 4a is still described as 'annular'.

The shaft 2 rotates with the inner race 4b of the bearing assembly 4 and radial vibratory motion of the shaft 2 (for example due to shaft in-balance) is transmitted through the bearing assembly 4, which moves along the axis B relative to the bearing casing 6; this radial movement of the bearing assembly 4 is dampened by the squeeze film 8.

The axial ends of the squeeze film 8 are sealed by first and second gap seals 10, 12 which are provided between radially-overlapping sealing faces on the outer race 4a and bearing casing 6 respectively, and permit relative radial movement of the outer race 4a and the bearing casing 6.

To maintain an effective seal along the gap seals 10, 12 it is necessary to adhere to strict axial tolerances and in practice this has proved difficult using conventional machining.

In order to alleviate the above-mentioned problems associated with machining gap seals, radial seals are typically employed as an alternative to face-seals. However, the radial seal must be radially compliant to accommodate relative radial movement between the inner component defining the seal film (for example the outer race 4a) and the outer component defining the squeeze film (for example the bearing casing 6). This requirement for radial compliance has necessitated the use of elastomeric sealing elements such as O-rings, but the problem then arises that such elastomeric sealing elements are often wholly unsuitable for high temperature applications.

It is an object of the present invention to seek to provide an improved squeeze-film damper arrangement.

According to the present invention there is provided a squeeze-film damper arrangement in which a face-seal is provided between opposing faces of a pair of circumferentially extending and radially overlapping sealing elements, said pair of sealing elements being mounted about an axis and a first one of the sealing elements in said pair being mounted for axial movement and being biased against the second of said sealing elements in said pair to form said face-seal in an axial direction.

According to one aspect of the present invention there is provided a squeeze-film damper arrangement comprising: concentric inner and outer components defining an annular gap there between for accommodating radial motion of the inner component within the outer component; and a fluid filling the annular gap around the outside of the inner component for damping said radial motion of the inner component, the fluid being axially contained between spaced-apart, first and second face-seals provided between the inner and outer components; wherein the first face-seal is provided between the opposing faces of a first pair of radially overlapping circumferential sealing elements associated with the inner and outer components respectively, a first one of the circumferential sealing elements in said pair being mounted for axial movement relative to the associated inner or outer component and being axially biased against the second of said circumferential sealing elements in said pair to form the first face-seal.

The biasing of the circumferential sealing elements may be such that the primary sealing of the squeeze film damper arrangement is in an axial direction. Accordingly the invention may provide for an axial face seal as opposed to the radial seals of the prior art.

The first circumferential sealing element may be axially biased against the second circumferential sealing element by the pressure of the fluid within the annular gap.

Additionally or alternatively, the first circumferential sealing element may be axially biased against the second circumferential sealing element by a mechanical spring.

The first and/or second face-seals may be radially compliant.

The first circumferential sealing element in the pair may be mounted in an annular rebate formed at an end of the associated inner or outer component and is further piloted for said axial movement relative to that associated component. The inner or outer component may comprise a shoulder formation which opposes the second circumferential sealing element in the pair.

The second circumferential sealing element in the pair may be provided on an axial end cap configured for attachment to the associated inner or outer component. The end cap may be attachable to an axial end of the inner or outer component.

In one embodiment, a fixed radial clearance is provided between the first circumferential sealing element and the associated inner or outer component for reducing sliding friction during said axial movement of the first circumferential sealing element, the radial clearance nevertheless being dimensioned for ensuring an effective circumferential or radial seal between the first circumferential sealing element and the associated inner or outer component.

In one embodiment, the first circumferential sealing element is annular in form and may be in the form of a continuous ring. The first circumferential sealing element may be in the form of a metallic sealing ring.

The second circumferential element may conveniently be an annular sealing flange.

In one embodiment, the second face-seal is provided between a respective second pair of circumferential sealing elements associated with the inner and outer component respectively. The second pair of circumferential sealing elements may be in accordance with the first pair of circumferential sealing elements recited in any preceding claim. The respective first circumferential sealing elements in the corresponding first and second pair may optionally be mounted on the inner and outer component respectively.

In another embodiment, the second pair of sealing elements may not be mounted for axial movement there-between during use. The relative axial positions of the second pair of sealing elements may be fixed during use. The second pair of sealing elements may comprise opposing shoulder or flange formations on the inner and outer components respectively.

Thus an-axially moveable sealing element may be required at one end of the squeeze film damper only.

The second face-seal may be provided between opposing fixed, radially overlapping faces of the inner and outer components respectively, the components being axially biased against one another to form the second face-seal between the radially-overlapping faces. The components may be axially biased against one another to form the second face-seal by the pressure of the fluid within the annular gap.

A first one of the components may be provided with a radially-extending shoulder portion, the fluid pressure acting axially on the radially-extending shoulder portion to axially bias the first component against the other component to form the second face-seal. The aforementioned annular rebate may define the radially extending shoulder portion.

Optionally, a mechanical spring is provided between the first circumferential sealing element and the associated component, the mechanical spring being configured for axially biasing the first circumferential sealing element and the associated component away from one another and into engagement with the second circumferential sealing element and the other component respectively to form said first and second face-seals.

Optionally, the arrangement further comprises a circumferential fluid feed-channel for feeding fluid into the annular gap, the feed-channel being axially off-set towards the second face-seal.

In one embodiment, the inner component is the outer race of a bearing assembly, the bearing assembly having a corresponding inner race for rotatably supporting a rotating component. The bearing assembly may rotatably support a rotating shaft in a gas turbine.

Alternatively, the inner and outer components may be the inner and outer races of a fluid bearing. The outer component may be a connecting rod for a piston and the inner component may be an associated crankshaft journal for the big-end of the connecting rod.

Embodiments of the invention are described below, by way of example, with reference to the accompanying drawings in which.

Figure 1:
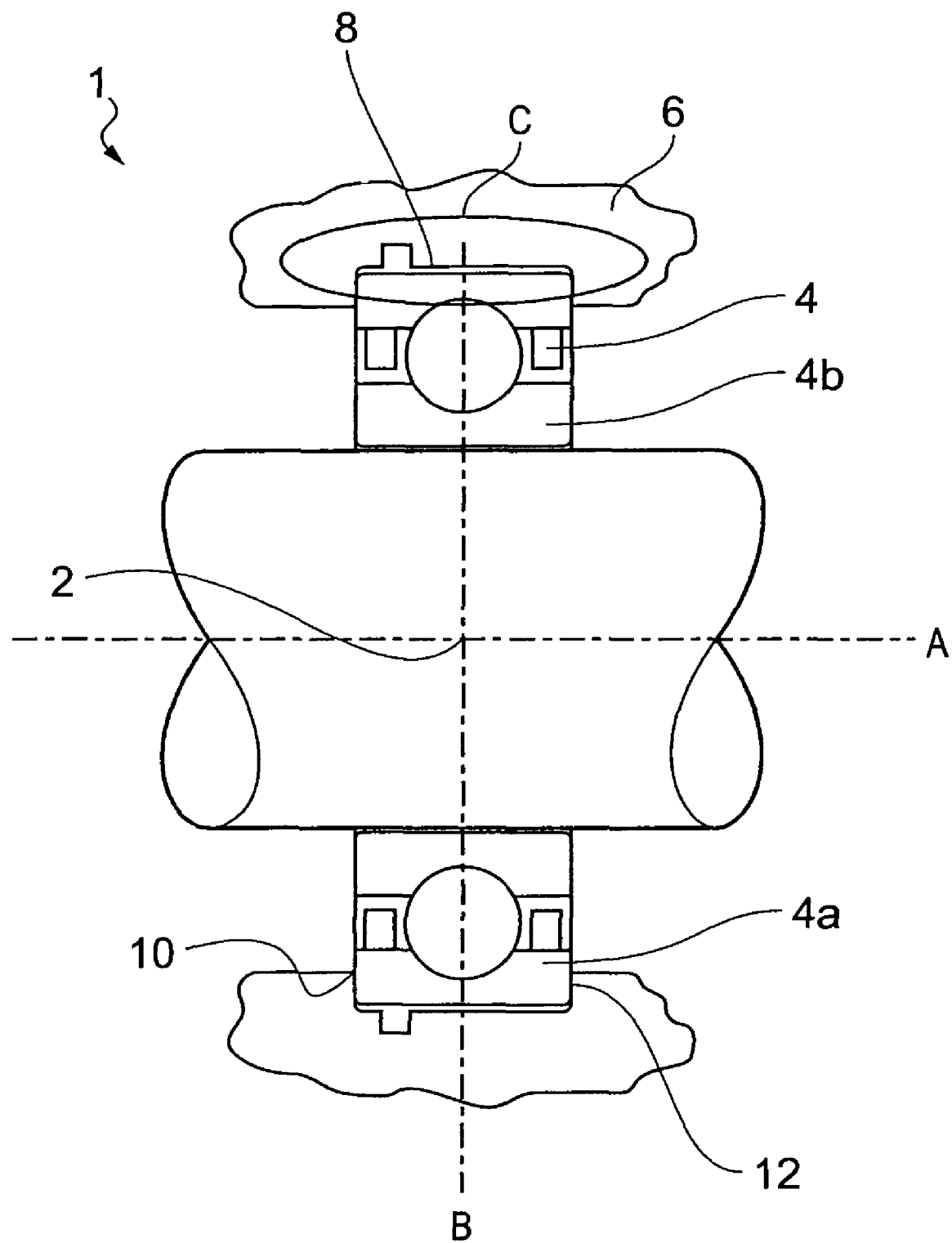
FIG. 1 (PRIOR ART) is a conventional squeeze-film damper arrangement.
Figure 3A:
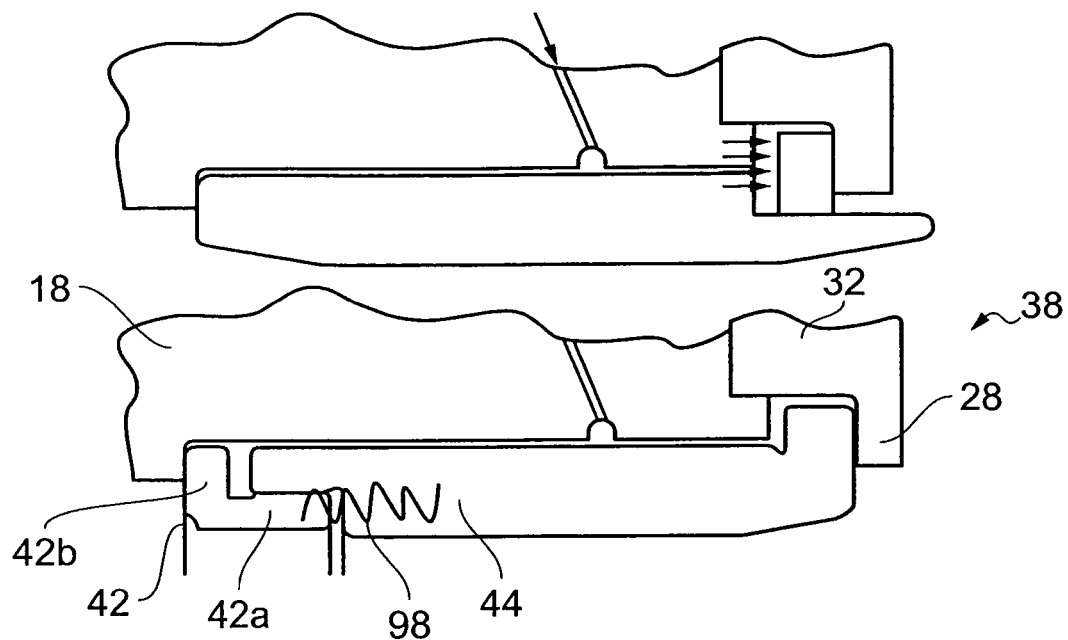
FIGS. 3a and 3b are schematic cross-sectional views through part of two further alternative squeeze-film damper arrangements.
Figure 3B:
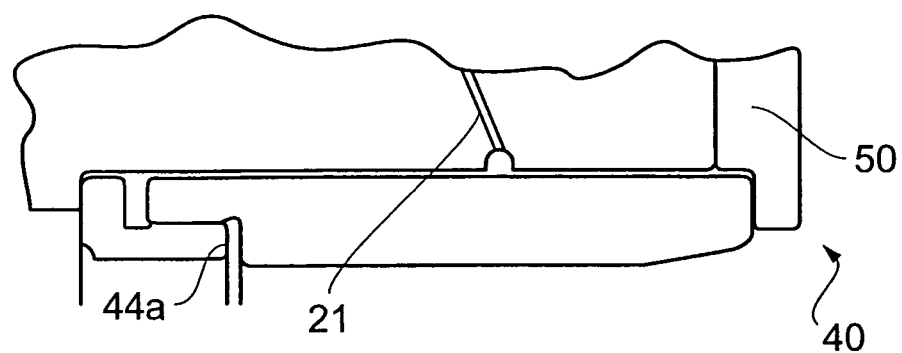
Figure 4:
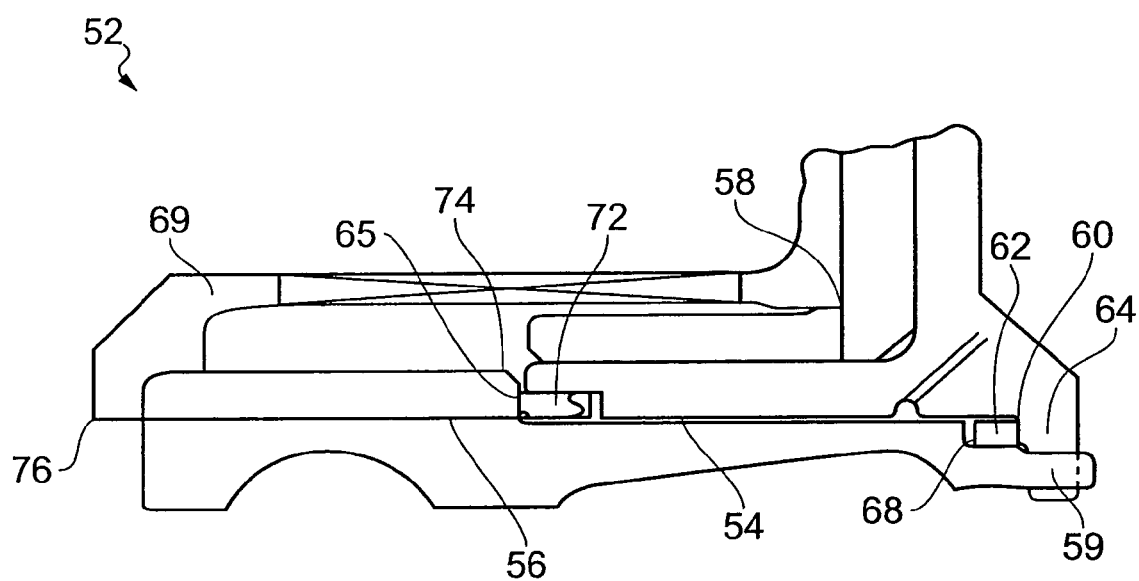
FIG. 4 is a schematic cross-sectional view through part of a an alternative squeeze-film damper arrangement that uses two sealing rings.

It should be noted that in FIG. 2 to 4 only a part of the respective squeeze-film arrangement is actually illustrated, being that part roughly designated by the circled area C in the specific case of arrangement 1 in FIG. 1.

Figure 2A:
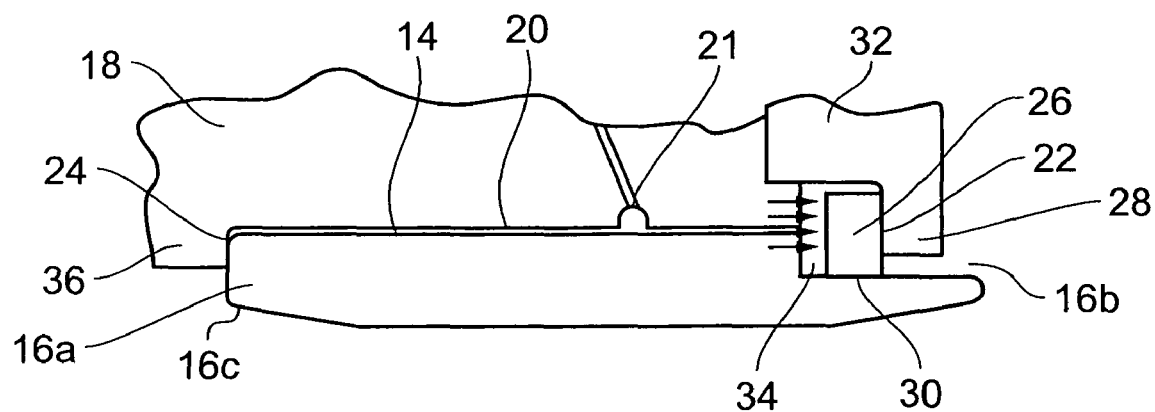
FIGS. 2a and 2b are schematic cross-sectional views through part of a squeeze-film damper arrangement suitable for gas turbine applications.
Figure 2B:
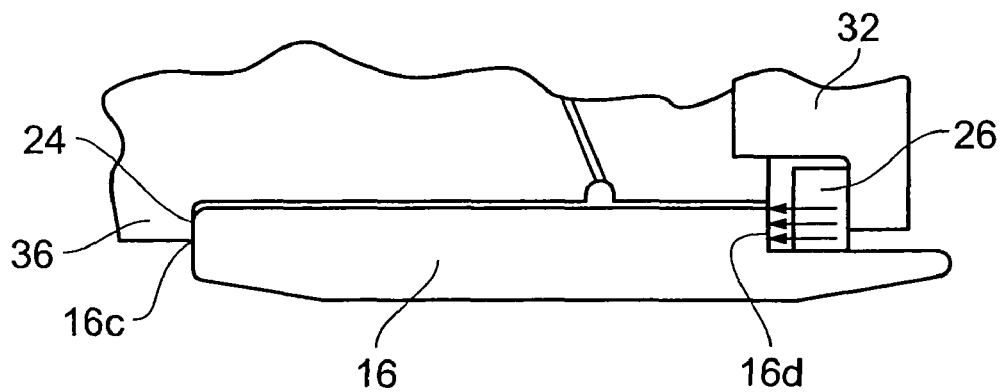

Referring first of all to FIGS. 2a and 2b, a squeeze film arrangement 14 comprises an inner component in the form of the outer race 16a of a bearing assembly, an outer component in the form of a bearing housing 18 extending concentrically around the outer race 16a, and a squeeze-film in the form of an oil-filled annular gap 20 between the housing 18 and the outer race 16a, fed by oil from a circumferential feed groove 21 extending around the inner face 18a of the housing 18.

The annular gap 20 accommodates radial movement of the outer race 16a within the housing 18, and the oil within the annular gap 20 dampens such radial movement in the manner of a conventional squeeze film. The radial movement may be transmitted from an associated rotating shaft, not shown, which may for example be a rotor in a gas turbine.

The oil in the gap 20 is axially contained between spaced-apart first and second face seals 22, 24. The face seals 22, 24 must be sufficiently effective to maintain fluid loss from the annular gap 20 within acceptable operational limits for adequate "long bearing" performance but at the same time need to be radially-compliant in that they allow the aforementioned radial movement of the outer race 16a relative to the housing 18.

The face seal 22 is formed between a pair of circumferential sealing elements, specifically a metallic sealing ring 26 and a corresponding circumferential sealing flange 28.

The sealing ring 26 is piloted by conventional guide means (not shown) for axial sliding movement along an external, annular rebate 16b formed at one end of the outer race 16a.

The sealing ring 26 may be mounted to either the outer race 16a or some other part of the arrangement such as the housing 18.

In order to reduce sliding friction between the sealing ring 26 and the outer race 16a during relative axial movement a fixed radial clearance, in this case an annular clearance 30, is maintained between the sealing ring and the outer race 16a. The clearance 30 must be sufficiently small that the sealing ring 26 maintains a circumferential seal around the outside of the associated outer race 16a, thus adequately minimising loss of oil from the gap 20 through the clearance 30.

It should be appreciated that the machining tolerances required for the gap 20, though small, are radial tolerances rather than axial tolerances; it is envisaged that such radial tolerances could be achieved much more readily than corresponding axial tolerances using the conventional machining techniques and equipment associated with manufacturing rotating machinery.

The circumferential sealing flange 28 is provided on a corresponding axial end cap 32 that is configured for attachment to the end of the associated housing 18 opposite the annular rebate 16b. With the end cap 32 attached to the housing 18 as shown in FIGS. 2a and 2b, the circumferential sealing flange 28 and the sealing ring 26 radially overlap one another, with the circumferential sealing flange effectively representing an end stop for axial movement of the sealing ring 26.

It is to be noted that the outer circumferential edge of the sealing ring 26 is spaced from the opposing face or edge of the end cap. Accordingly the outer circumferential edge of the ring 26 is not required to provide a seal against the end cap. Rather the axial biasing of the ring 26 causes an axial face seal with the sealing flange 28 of the end cap as will be described below in further detail. The gap between the outer circumferential edge of the ring 26 and the opposing end cap surface is greater than the clearance 30 between the ring and the outer race 16a and may be of magnitude similar to that of the annular gap 20.

During operation of the squeeze film arrangement 14 the annular gap 20 is fed with oil at a pressure greater than atmospheric pressure. The annular gap 20 is therefore effectively an oil plenum that axially biases the sealing ring 26 against the circumferential sealing flange 28 to maintain the face seal 22 (as indicated by the arrows in FIG. 2a). Thus the sealing ring is biased into contact with the flange 28 of the end cap during normal operation such that the primary seal is an axial face seal.

The portion of the end cap 32 adjacent the end of the housing 18 is recessed to form a circumferential cavity 34 in conjunction with the corresponding portion of the annular rebate 16b; it is envisaged that the cavity 34 may advantageously attenuate the oil pressure adjacent the seal 22 by allowing a degree of localised circumferential fluid flow. In addition, the cavity 34 accommodates radial movement of the sealing ring 26 (with the outer race 16a) relative to the housing 18, thus contributing to the radial compliance of the seal 22.

The second face seal 24 is provided between fixed radially overlapping faces on the housing 18 and outer race 16a specifically. The respective sealing face on the housing 18 is provided on a fixed circumferential flange portion 36 and the respective sealing face on the outer race 16a is the axial end face 16c of the outer race 16a (remote from the annular rebate 16b).

In similar manner to the sealing ring 26 and the sealing flange 28, the bearing outer race 16a and the housing 18, specifically the flange portion 36 and the end face 16c, are axially biased against one another by the operational oil pressure within the annular gap 20 to maintain the second face-seal 24. The oil pressure acts primarily on a shoulder portion 16d of the outer race 16a, as indicated by the arrows in FIG. 2b, the shoulder portion 16d being formed at the inner end of the annular rebate 16b.

In the arrangement 14 shown in FIG. 2, the oil pressure in the gap 20 acts to maintain both of the radially compliant first and second face-seals 22, 24, effectively independently of any axial machining tolerances. The axial biasing of the ring 26 in rebate 16b thus effectively avoids the tolerance issues associated with the arrangement of FIG. 1, such that the second face seal can be formed in a conventional manner. This provides a cost-effective solution to the tolerance issues discussed above whilst ensuring effective sealing of the squeeze film damper is achieved.

Initial installation of the arrangement 14 is also effectively unaffected by axial machining tolerances. Thus, referring to FIGS. 2a and 2b, it is envisaged that the arrangement 14 could be "axially" built-up from the end of the housing 18 opposite the circumferential flange portion 36. Once the outer race 16 and housing 18 have been assembled, the ring 26 can simply be located in rebate 16b followed by application of the end cap 32.

Turning to FIGS. 3a and 3b, two alternative squeeze film arrangements 38, 40 are shown which are analogous to the arrangement 14, but which implement different specific configurations for the respective sealing ring, bearing outer race and end cap. Like numerals have been used to designate like features for continuity.

Thus, in FIG. 3a, the respective sealing ring 42 is provided at the opposite end of the housing 18 from the end cap 32. The sealing ring 42 comprises a generally L-shaped cross-section defining a collar portion 42a and an outwardly turned peripheral rim portion 42b for engaging the circumferential flange portion 36 to form the first face-seal 22. In similar manner to the sealing ring 26, the sealing ring 42 is piloted for axial movement along an internal annular rebate 44a formed on the associated bearing outer race 44, with a fine-tolerance radial clearance 46 being provided between the outer race 44 and the sealing ring 42, corresponding to the radial clearance 30 in squeeze-film arrangement 14 (FIGS. 2a and 2b). The second face seal 24 is formed between a fixed flange portion 48 on the outer race 44 and the circumferential flange 28 on the end cap 32.

In FIG. 3b, a modified end cap 50 is provided. The end cap 50 is not recessed to form any sort of cavity corresponding to the cavity 34 in the case of the corresponding end cap 32 (FIGS. 2a and 2b). Here, the outer race 44 does not incorporate any fixed flange portion adjacent the end cap 50 and the second seal is provided between the circumferential flange 28 (on the end cap 50) and an axial end face 44b of the outer race 44.

Turning now to FIG. 4, a yet further alternative squeeze-film arrangement 52 is shown, wherein an oil-filled annular gap 54 is provided between a bearing outer race 56 and a housing 58.

In contrast to the previous described arrangements, the first and second face seals in arrangement 52 are each provided between respective pairs of circumferential sealing elements, a first one of the circumferential sealing elements in each pair being mounted for axial movement relative to the associated inner or outer component and being axially biased against the second circumferential sealing element in the respective pair to form the first or second face-seal as appropriate.

Thus, in the arrangement 52 a first face-seal 60 is provided between a sealing ring 62 and a respective circumferential sealing flange 64 on the housing 58. The sealing ring 62 corresponds essentially to the sealing ring 26 described in arrangement 14 in FIGS. 2a and 2b; briefly, the sealing ring 62 is piloted for axial movement along a corresponding external annular rebate 68 formed at one end of the associated bearing outer race 56 for face-sealing engagement with the corresponding radially overlapping circumferential flange 64 on the housing 58.

Oil pressure within the annular gap 54, supplied by oil feed groove 22, axially biases the sealing ring 62 against the circumferential sealing flange 64.

A second face seal 65 is provided between a second sealing ring 72 and a second circumferential flange portion 74 formed as part of the bearing outer race 56. The second sealing ring 72 is again piloted for axial movement, this time along an internal annular rebate 76 formed at the end of the associated housing 58, remote from the first sealing ring 62. The oil pressure within the annular gap 54 axially biases the second sealing ring 72 against the flange portion 74 to form the second seal 65.

In order to allow for axial biasing of the second sealing ring 72 against the second circumferential sealing flange 74, the outer race 56 must be held against axial movement away from the second sealing ring 72 due to oil pressure acting on the shoulder portion 56a formed by the external annular rebate 68. The outer race is effectively held in place by a flex-bar support 69 fixed to the housing 58, which both prevents such axial movement of the outer race 56 away from the second sealing ring 72 and also supports the weight of the bearing assembly (not shown) associated with the outer race 56, so as to centre the bearing assembly within the housing 58.

The arrangement 52 is also provided with a conventional anti-rotation assembly, illustrated only schematically at 59, which is intended to prevent relative rotation of the bearing outer race 56 and the housing 58 about the bearing axis D.

It will be appreciated that, in similar manner to arrangements 14, 38 and 40, the arrangement 52 is likewise configured for maintaining the first and second face-seals 60, 65 effectively independently of any axial tolerances.

Figure 5:
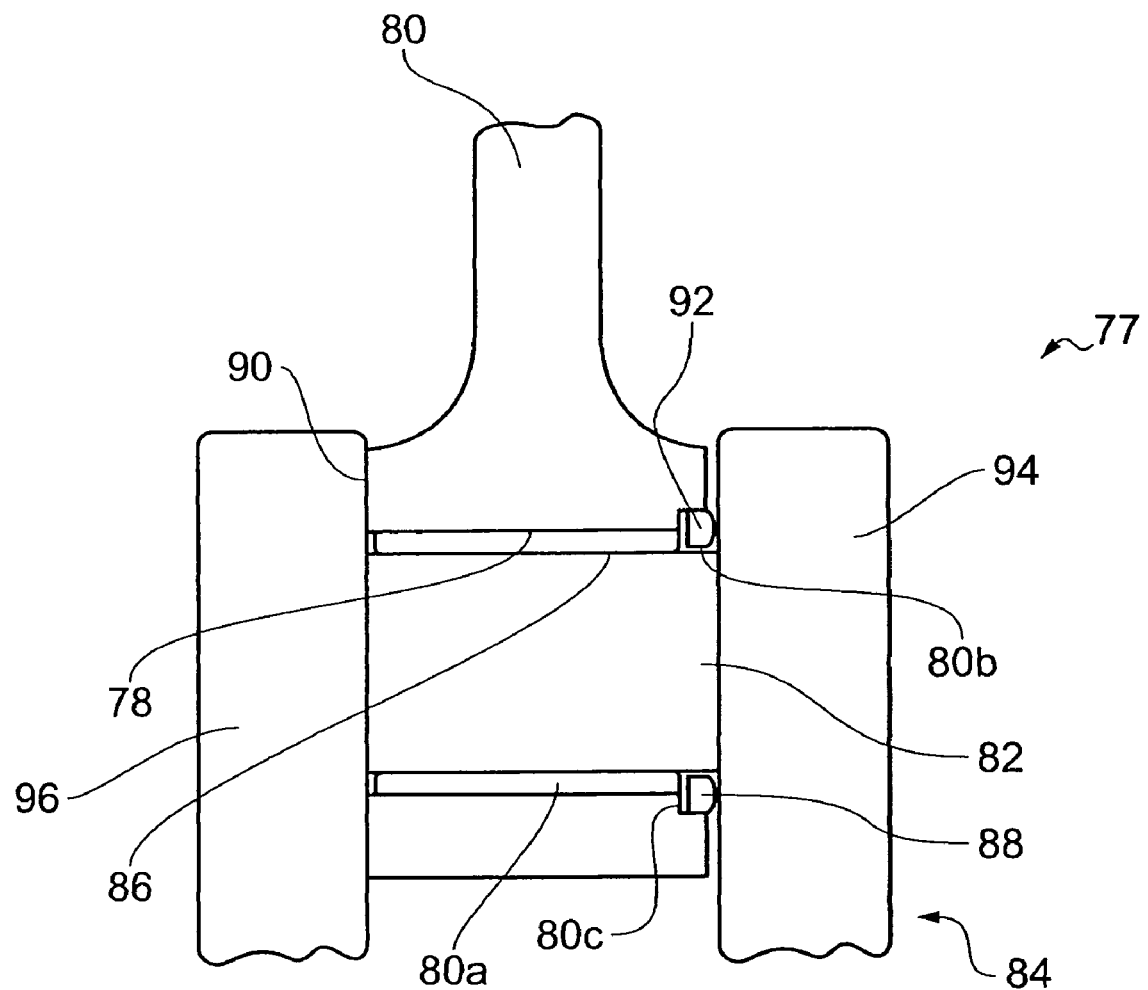
FIG. 5 is a schematic cross-sectional view through a squeeze film damper arrangement for the big end of a connecting rod in an internal combustion engine.

FIG. 5 shows an alternative type of squeeze film arrangement 77 wherein the squeeze film is a fluid bearing 78 provided between a connecting rod 80 for a piston on an internal combustion engine and a journal 82 provided on the corresponding crankshaft 84 for rotatably supporting the "big end" of the connecting rod 80.

The arrangement 76 is similar to the arrangement 14 illustrated in FIGS. 2a and 2b.

Thus, the fluid-bearing 78 comprises an annular gap 86 provided between an inner component, in this case the journal 82, and an outer, concentric component, in this case a concentric bearing casing 80a forming part of the connecting rod 80. The annular gap 86 is filled with a bearing fluid such as oil, which in addition to providing rotational bearing support for the connecting rod 80 on the journal 82, also acts as a squeeze film to dampen radial movement of the journal 82 relative to the connecting rod 80.

The oil is axially contained in the gap 86 by first and second face seals 88, 90.

The first face seal 88 is provided between a sealing ring 92, piloted for axial movement along an internal rebate 80b on the associated connecting rod 80 and a first circumferential sealing element in the form of a first crankshaft flange 94. The sealing ring 92 is axially biased against the crankshaft flange 94 by oil pressure within the annular gap 86. A fixed radial clearance is provided between the sealing ring 92 and the associated connecting rod 80 for reducing sliding friction between the sealing ring 92 and the connecting rod 80 whilst nevertheless maintaining a sufficient circumferential seal around the connecting rod 80 to prevent excessive oil loss between the connecting rod 80 and the sealing ring 92.

The second face seal 90 is provided between radially overlapping sealing faces on the connecting rod 80 and a second crankshaft sealing flange 96, with the connecting rod 80 and the crankshaft sealing flange 96 being axially biased against one another by oil pressure within the gap 86 acting on a shoulder portion 80c formed by the internal rebate 80b on the connecting rod 80.

Although in the embodiments described the first and second face seals are maintained by pressure of fluid within the respective squeeze film, it is envisaged that the face seals might additionally or alternatively be maintained by mechanical biasing means such as, for example, a coil spring 98 illustrated very schematically in FIG. 3a in the context of arrangement 38.

The sealing rings described in the various embodiments are preferably solid rings. Whilst split rings, similar to piston rings, or segmented rings, may be used, it is to be understood that piston rings are conventionally used to provide a circumferential seal rather than an axial face seal. It is considered that such split rings will increase the cost of the damper arrangement.

It will be appreciated that all of the components forming the squeeze-film arrangements 14, 38, 40, 52 and 77 may be metallic and therefore the arrangements as a whole can be used in high-temperature applications.

The circumferential feed groove 21 may be offset towards one or other of the first and second face seals, as shown in FIG. 2 to 4, in order to advantageously adjust the pressure distribution within the respective squeeze film.

Whilst the embodiments of FIG. 2 to 4 are described with reference to a rebate or shoulder on the outer bearing race in which the sealing ring sits, it will be appreciated that a suitable rebate formation could equally be provided in the housing. In such an embodiment, an end cap or other suitable circumferential sealing flange formation could be provided on the outer bearing race. Accordingly the clearance 30 described in relation to FIG. 2 could be provided between the sealing ring and housing.

For the avoidance of any doubt, it is expressly noted that the reference numerals in the claims do not have any limiting effect on the scope of the claims.

The invention claimed is:

1. A squeeze-film damper arrangement comprising:
concentric inner and outer components defining an annular gap there-between for accommodating radial motion of the inner component within the outer component; and
a fluid filling the annular gap around the outside of the inner component for damping said radial motion of the inner component, the fluid being axially contained between spaced-apart first and second face-seals provided between the inner and outer components, wherein
the first face-seal is provided between opposing faces of a first pair of radially overlapping circumferentially extending sealing elements associated with the inner and outer components respectively, a first one of the sealing elements in said first pair being mounted for axial movement relative to the associated inner or outer component and being axially biased against a second of the sealing elements in said first pair such that the first face-seal is formed in an axial direction, and
the second face-seal is provided between opposing fixed, radially overlapping faces of the inner and outer components respectively, the inner and outer components being axially biased against one another to form the second face-seal between the radially-overlapping faces.

2. The arrangement according to claim 1, wherein said first one of the sealing elements is biased against the second of the sealing elements by the pressure of the fluid within the annular gap in an axial direction rather than to a radial direction.

3. The arrangement according to claim 1, wherein said first one of the sealing elements is axially biased against the second of the sealing elements by a mechanical spring.

4. The arrangement according to claim 1, wherein the first one of the sealing elements in the first pair is mounted in an annular rebate formed at an end of the associated inner or outer component and is further piloted for said axial movement relative to the associated inner or outer component.

5. The arrangement according to claim 4, wherein the rebate is shaped so as to promote axial biasing of the first one of the sealing elements rather than radial or circumferential biasing.

6. The arrangement according to claim 1, wherein the second of the sealing elements in the first pair is provided on an axial end cap configured for attachment to the associated inner or outer component.

7. The arrangement according to claim 1 wherein a fixed radial clearance is provided between the first one of the sealing elements and the associated inner or outer component for reducing sliding friction during said axial movement of the first one of the sealing elements, the radial clearance nevertheless being dimensioned for ensuring an effective circumferential seal between the first one of the sealing elements and the associated inner or outer component.

8. The arrangement according to claim 1, wherein the first one of the sealing elements is in the form of a continuous sealing ring.

9. The arrangement according to claim 1, wherein the second of the sealing elements is an annular sealing flange.

10. The arrangement according to claim 1, wherein the second face-seal is provided between a respective second pair of sealing elements associated with the inner and outer component respectively, the second pair of sealing elements being in accordance with the first pair of sealing elements.

11. The arrangement according to claim 10, wherein the respective first one of the sealing elements in the corresponding first and second pair are mounted on the inner and outer component respectively.

12. The arrangement according to claim 1, wherein the components are axially biased against one another to form the second face-seal by the pressure of the fluid within the annular gap.

13. The arrangement according to claim 12, wherein a first one of the components is provided with a radially-extending shoulder portion, the fluid pressure acting axially on the radially-extending shoulder portion to axially bias the first one of the components against a component other than the first one of the components to form the second face-seal.

14. The arrangement according to claim 13, wherein an annular rebate is formed in the inner or outer component and the radially extending shoulder portion is defined by said rebate.

15. The arrangement according to claim 1, wherein a mechanical spring is provided between the first one of the sealing elements and an associated component, the mechanical spring being configured for axially biasing the first one of the sealing elements and the associated component away from one another and into engagement with the second of the sealing elements and a component other than the associated component respectively to form said first and second face-seals.

16. The arrangement according to claim 1, wherein the arrangement further comprises a circumferential fluid feed-channel for feeding the fluid into the annular gap, the feed-channel being axially off-set towards the first or second face-seal.

17. The arrangement according to claim 1, wherein the inner component is an outer race of a bearing assembly, the bearing assembly having a corresponding inner race for rotatably supporting a rotating component.

18. The arrangement according to claim 17 in a gas turbine.

19. The arrangement according to claim 1, wherein the inner and outer components represent the inner and outer races of a fluid bearing.

20. The arrangement according to claim 19, wherein the outer component is a connecting rod for a piston and the inner component is an associated crankshaft journal for a big-end of the connecting rod.

* * * * *